United States Patent Office 3,300,276
Patented Jan. 24, 1967

3,300,276
PROCESS FOR SOLUBILIZING VANADIUM VALUES
Günther Bretschneider, Gelnhausen, and Fritz Sperr, Frankfurt am Main, Germany, assignors to Deutsche Gold- und Silber-Scheideanstalt vormals Roessler, Frankfurt am Main, Germany
No Drawing. Filed Apr. 24, 1964, Ser. No. 362,480
Claims priority, application Germany, Apr. 26, 1963, D 41,439
1 Claim. (Cl. 23—15)

The present invention relates to an improved process whereby difficultly soluble vanadium values contained in slags, ores, residues and the like are solubilized.

It is known that such difficultly soluble vanadium values can be solubilized by treatment with mineral acids of various concentrations in the presence of oxidizing agents and that the resulting soluble vanadium compound can be converted to ammonium metavanadate by reaction with an ammonium salt. It is also known that the latter can be decomposed to $V_2O_5$ at elevated temperatures. The solubilization with acids, however, has the disadvantage that all other substances soluble in acids and especially iron are also taken up in the solution. The presence of such other substances in the solution causes considerable difficulties in processing and separating vanadium values from such solutions. Particularly disadvantageous is the formation of iron vanadate which already precipitates out at a pH of 4.

According to the invention it was found that presence of compounds which disturb the processing of solubilized vanadium values can be avoided when a melt essentially consisting of a mixture of an alkali metal carbonate and an alkali metal chloride is employed for the solubilization and such solubilization is carried out under oxidizing conditions. Preferably a mixture of sodium carbonate and sodium chloride is employed for such melt. In the process according to the invention, therefore, the difficultly soluble vanadium values, especially, those contained in slags, ores, residues and the like, are solubilized by treatment with a melt essentially consisting of an alkali metal carbonate and an alkali metal chloride in the presence of an oxidizing agent and the resulting fused cake extracted with water to extract the solubilized vanadium values and, if desired, the pH of the resulting solution can be adjusted to 3 to about 7, preferably about 6.5, an ammonium salt added thereto at about 90° C. and cooling such solution to about 15–20° C. to precipitate the ammonium metavanadate. The latter, if desired, can also be converted to $V_2O_5$ by decomposition at about 300° C.

It has been found especially advantageous to employ mixtures for the melt which contain alkali metal carbonate and alkali metal chloride in ratios from about 1:0.5 to about 0.5:1 by weight as such mixtures have a relatively low fusion temperature. It is possible in this way to maintain the ratio of the starting material from which the vanadium is to be solubilized to the alkali metal carbonate and the alkali metal chloride from about 1:1:0.5 to about 1:0.5:1 by weight and to work at temperatures above about 400° C., preferably, between about 600 and 700° C. In this way practically quantitative conversions to alkali metal vanadates are attained.

It is expedient to blow air over the thinly liquid melt as the oxidizing agent. It is also advantageous to work in a rotary furnace in which the surface of the melt is constantly renewed by the rotation of the furnace. However, it is also possible to use oxygen as the oxidizing agent or to add solid oxidizing agents, such as chlorates, nitrates or peroxides, directly to the melt.

The fusion of the melt can be effected and maintained by direct heating with an oxidizing flame or by indirect heating.

One of the particular advantages of the presence of alkali metal chloride in the melts according to the invention is that when it is expedient to employ smaller quantities of alkali metal carbonate a thinly liquid melt can always be provided at the temperature in question by appropriate adjustment of the quantity of alkali metal chloride. This becomes especially apparent when the material from which the vanadium values are to be solubilized has varying contents of vanadium and it is, for example, not necessary when only a small quantity of vanadium is present to work with high excesses of alkali metal carbonate.

In the process according to the invention, the iron present in the starting material remains with the insoluble residue upon extraction of the treated mass with water. Any aluminum oxide or silicic acid which may eventually have been solubilized along with the vanadium values precipitate out during the treatment with water as insoluble alkali metal aluminum silicate. In this connection, if the proportion of silicic acid in the starting material is too low in comparison with the $Al_2O_3$ content it is advisable to mix additional silica therewith to make up for this deficiency.

Upon extraction of the treated mass with water an aqueous alkaline alkali metal vanadate solution is obtained which does not contain compounds which are disturbing during the subsequent processing of the solution. Normally such solution contains 96 to 98% of the vanadium values contained in the starting material as the alkali metal vanadate.

The pH of the alkaline filtrate can then be adjusted to a value between about 3 and 7 with a mineral acid and an ammonium salt corresponding to the acid used for such adjustment added thereto hot and the ammonium metavanadate produced precipitated out by cooling.

The alkali metal chloride as well as the other salts have a salting out effect in this connection so that only relatively small quantities of ammonium salts are required.

It has been found advisable to maintain a temperature of about 80° C. to about 90° C. for about one hour after addition of the ammonium salt before cooling the solution to precipitate out the ammonium metavanadate. The precipitated ammonium metavanadate upon filtering off is still contaminated with small amounts of adhering salts, such as alkali metal chloride, alkali metal sulfate and ammonium sulfate. The filtrate only contains about 0.5% of dissolved ammonium metavanadate. The filtered ammonium metavanadate is washed to remove the adhering salts and the wash water, which contains about 10% of the ammonium metavanadate dissolved therein, is recycled for use with further water for the extraction of further quantities of the treated material containing the solubilized vanadium values. It is possible in this way to avoid losses of vanadium values practically completely.

The washed ammonium metavanadate is then dried and can thereafter be decomposed in a known manner to powdery vanadium pentoxide by heating to temperatures of, for example, around 450° C. The yields of vanadium pentoxide as based on the vanadium value content of the starting material is between 95 to 98% at a purity of at least 98.5%.

The process according to the invention is suitable for solubilizing the vanadium values contained in ores, slags, residues, as well as in fly ashes. The slags and residues may be produced as by-products in the processing of ores as well as of used vanadium containing catalysts. Residues and fly ash which are produced in petrochemical processes which may also contain vanadium values originating in the petroleum itself also can be treated by the process according to the invention.

The composition of such slags and residues may vary considerably depending upon the origin of such material. The following are several typical analyses:

SLAGS AND RESIDUES

|  | Sample 1, percent | Sample 2, percent | Sample 3, percent |
|---|---|---|---|
| V | 25.1 | 15.95 | 8.45 |
| Fe | 1.72 | 1.63 | 1.12 |
| Al | 1.02 | 2.48 | 2.44 |
| Cr | 0.08 | 0.13 | 0.11 |
| Cu | 0.08 | 0.06 | 0.07 |
| Pb |  |  | 0.09 |
| As | 0.006 | 0.005 | 0.008 |
| CaO | 16.94 | 18.33 | 27.42 |
| MgO | 1.52 | 3.67 | 14.05 |
| $SiO_2$ | 3.80 | 6.18 | 7.25 |
| S | 5.52 | 11.48 | 17.03 |
| C | 1.67 | 2.27 | 1.28 |
| P | 0.03 | 0.02 | 0.05 |

The vanadium in these products can be pentavalent as well as quadrivalent and partially also in elemental form.

FLY ASH FROM PETROLEUM INDUSTRY

| V | 7.15 | MgO | 0.84 |
|---|---|---|---|
| Fe | 2.05 | $SiO^2$ | 0.72 |
| CaO | 0.91 | S | 8.31 |
|  |  | C | 57.30 |

Typically the vanadium content in such fly ash is 7 to 12%.

RESIDUE FORM ORE PROCESSING

|  | Percent |
|---|---|
| Loss on ignition | 2.6 |
| V total | 20.5 |
| $Al_2O_3$ | 0.7 |
| FeO | 5.8 |
| MnO | <0.1 |
| $TiO_2$ | <0.01 |
| NiO | 3.4 |
| CaO | 20.1 |
| MgO | 13.9 |
| $SiO_2$ | 11.6 |
| $P_2O_5$ | 0.2 |
| $Na^+$ | 1.6 |
| $SO_4^{--}$ | 9.0 |

The following examples will serve to illustrate the process according to the invention.

*Example 1*

1.8 kg. of a vanadium containing slag of the following composition

|  | Percent |
|---|---|
| V | [1] 20.0 |
| Fe | 1.6 |
| Al | 1.0 |
| CaO | 19.0 |
| MgO | 3.1 |
| $SiO_2$ | 4.1 |
| S | 7.0 |
| C | 2.4 |

[1] =35.7% $V_2O_5$.

were comminuted and mixed with 1.8 kg. of $Na_2CO_3$ and 0.9 kg. of NaCl and such mixture introduced into a rotary drum furnace in which it was directly heated and melted with an oxidizing flame. The temperature of the melt was about 650° C. and such temperature was maintained for about 30 minutes while passing air thereover.

After cooling the melt it was introduced into a vessel containing 10 liters of water in which the sodium vanadate which had formed was dissolved at about 80 to 90° C. while stirring. The insoluble residue was filtered off and after thorough washing discarded. The filtrate and the wash water were combined and placed in a corrosion resistant vessel. The pH thereof was adjusted to 6.5 with $H_2SO_4$. Then about 1.8 kg. of ammonium sulfate were added to the resulting solution at about 80 to 90° C. After about 30 minutes ammonium metavanadate started to crystallize out and after cooling to 15 to 20° C. precipitated out practically quantitatively. The precipitated salt was filtered off from the mother liquor which still contained about 0.5% of ammonium metavanadate. The ammonium metavanadate was washed with as small a quantity of water as possible and the wash water which contained about 10% of the vanadate as well as the impurities [$(NH_4)_2SO_4$, NaCl, $Na_2SO_4$] dissolved therein was recycled for use with further water for extraction of succeeding melts. Taking this recycled vanadium which was not lost into consideration, 0.87 kg. of ammonium metavanadate was obtained.

The ammonium metavanadate after drying was heated to 450° C. to produce 0.61 kg. of $V_2O_5$. When higher temperatures, for example, about 750° C., were used it was converted to melted $V_2O_5$. The yield of $V_2O_5$ with reference to the vanadium values obtained in the starting stage amounted to 95% with a 98.54% purity.

*Example 2*

A mixture of 1 part by weight (2.2 kg.) of a vanadium containing residue containing 16.4% vanadium of the following analysis:

|  | Percent |
|---|---|
| V | 16.4 |
| Fe | 2.4 |
| Al | 1.0 |
| Cr | 0.1 |
| Cu | 0.1 |
| Pb | 0.1 |
| CaO | 22.3 |
| MgO | 4.8 |
| S | 7.9 |
| C | 3.5 |
| $SiO_2$ | 7.2 |

0.75 part by weight of $Na_2CO_3$ and 0.5 part by weight of NaCl was heated as described in Example 1 at 650° C. Upon processing the resulting melt as described in Example 1 0.625 kg. or a 97% yield of $V_2O_5$ was obtained.

*Example 3*

2 kg. of vanadium containing fly ash with a 25.1% $V_2O_5$ content was mixed with 1 kg. of $Na_2CO_3$ and 1.5 kg. of NaCl and such mixture processed as in Example 1. The yield was 0.480 kg. of $V_2O_5$ which is 95.6% of theory.

*Example 4*

The procedure of Example 1 was repeated except that HCl was used to adjust the pH of the water extract and about 1 kg. of $NH_4Cl$ was used instead of the $(NH_4)_2SO_4$ for the formation of the ammonium metavanadate. The yield was 0.625 kg. of $V_2O_5$ which is 97.4% of theory.

We claim:

A method of recovering vanadium values from material containing difficultly soluble vanadium values selected from the group consisting of vanadium containing slags, residues from processing vanadium containing ores and vanadium containing catalysts and vanadium containing residues and fly ash produced in petrochemical processes, each of said vanadium containing materials containing the vanadium in at least one form selected from the group consisting of pentavalent vanadium, and quadrivalent vanadium, said material also containing aluminum values and silicon values, the content of said aluminum values being in excess of that of the silicon values calculated with reference to alkali metal aluminum silicate, which comprises admixing silica with said vanadium containing material to provide sufficient silica to be able to react with said excess aluminum values and contacting said vanadium containing material with a melt essentially consisting of an alkali metal carbonate and an alkali metal chloride in proportions between 0.1:1 and 1:0.5 by weight under oxidizing conditions at a temperature between about 600 and 700° C. until at least a substantial portion of the vanadium values in such material have been converted to alkali metal vanadate, cooling the resulting mixture and extracting such mixture with water to produce an aqueous solution containing vanadium values.

References Cited by the Examiner

UNITED STATES PATENTS

| | | | |
|---|---|---|---|
| 1,015,469 | 1/1912 | Bleecker | 23—16 |
| 1,255,144 | 2/1918 | Ekeley et al. | 23—19.1 |
| 1,554,917 | 9/1925 | Kunkle | 23—16 |
| 2,257,978 | 10/1941 | Robertson et al. | 23—18 |

FOREIGN PATENTS

| | | |
|---|---|---|
| 451,981 | 8/1936 | Great Britain. |
| 492,212 | 9/1938 | Great Britain. |

OSCAR R. VERTIZ, *Primary Examiner.*

MILTON WEISSMAN, H. T. CARTER,
*Assistant Examiners.*